United States Patent
Gouache et al.

(10) Patent No.: US 10,129,522 B2
(45) Date of Patent: Nov. 13, 2018

(54) PROCESSING DEVICE FOR THE GENERATION OF 3D CONTENT VERSIONS AND ASSOCIATED DEVICE FOR OBTAINING CONTENT

(71) Applicant: THOMSON LICENSING, Issy de Moulineaux (FR)

(72) Inventors: Stephane Gouache, Cesson-Sevigne (FR); Didier Doyen, La Bouexiere (FR); Guillaume Bichot, La Chapelle Chaussee (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 365 days.

(21) Appl. No.: 14/360,301

(22) PCT Filed: Nov. 23, 2012

(86) PCT No.: PCT/EP2012/073530
§ 371 (c)(1),
(2) Date: May 22, 2014

(87) PCT Pub. No.: WO2013/079420
PCT Pub. Date: Jun. 6, 2013

(65) Prior Publication Data
US 2014/0354772 A1    Dec. 4, 2014

(30) Foreign Application Priority Data
Nov. 28, 2011    (FR) .................................... 11 60868

(51) Int. Cl.
*H04N 13/00* (2018.01)
*H04N 13/128* (2018.01)
(Continued)

(52) U.S. Cl.
CPC ......... *H04N 13/128* (2018.05); *H04N 13/161* (2018.05); *H04N 13/194* (2018.05);
(Continued)

(58) Field of Classification Search
CPC ........... H04N 13/0022; H04N 13/0048; H04N 13/0059; H04N 19/597; H04N 21/23439;
(Continued)

(56) References Cited

U.S. PATENT DOCUMENTS 6,304,196 B1 * 10/2001 Copeland ............... H04N 19/60
341/50
6,545,700 B1 *  4/2003 Monroe ................. H04M 3/567
348/14.07
(Continued)

FOREIGN PATENT DOCUMENTS

GB      2285359       7/1995
JP      2003125019    4/2003
(Continued)

OTHER PUBLICATIONS

Tekalp A M et al, 3DTV over IP,vol. 24, No. 6, Nov. 2007.*
(Continued)

*Primary Examiner* — Md Haque
(74) *Attorney, Agent, or Firm* — Tutunjian & Bitetto, P.C.

(57) ABSTRACT

A device is intended to process three-dimensional content for a server. The three-dimensional content comprises at least two image sequences obtained from different angles, wherein a three-dimensional rendering is associated to a level of disparity between said at least two image sequences. This processing device is configured to generate from a content at least two different content versions corresponding to different levels of disparity adapted to different transmission bit rates, wherein the disparity level decreases with said transmission bit rate. A server comprising the processing
(Continued)

device, a three-dimensional content-obtaining device, and a content receiver comprising three-dimensional content-obtaining device are further disclosed.

9 Claims, 1 Drawing Sheet

(51) Int. Cl.

| | | |
|---|---|---|
| *H04N 13/194* | (2018.01) | |
| *H04N 21/2343* | (2011.01) | |
| *H04N 21/845* | (2011.01) | |
| *H04N 21/262* | (2011.01) | |
| *H04N 21/81* | (2011.01) | |
| *H04N 19/597* | (2014.01) | |
| *H04N 13/161* | (2018.01) | |

(52) U.S. Cl.
CPC ..... *H04N 19/597* (2014.11); *H04N 21/23439* (2013.01); *H04N 21/26258* (2013.01); *H04N 21/816* (2013.01); *H04N 21/8456* (2013.01)

(58) Field of Classification Search
CPC ........... H04N 21/26258; H04N 21/816; H04N 21/8456
See application file for complete search history.

(56) References Cited

U.S. PATENT DOCUMENTS

| | | | |
|---|---|---|---|
| 6,678,323 B2 | 1/2004 | Tam et al. | |
| 7,003,037 B1* | 2/2006 | Bordes .................. | H04N 19/63 375/240.16 |
| 2003/0202592 A1* | 10/2003 | Sohn .................... | H04N 19/597 375/240.16 |
| 2006/0015919 A1 | 1/2006 | Karppinnen et al. | |
| 2008/0267634 A1* | 10/2008 | Effenberger ........ | H04L 25/4908 398/128 |
| 2011/0208829 A1 | 8/2011 | Kwon et al. | |
| 2012/0069162 A1 | 3/2012 | Ota et al. | |
| 2012/0195493 A1* | 8/2012 | Lin ........................... | G06T 7/97 382/154 |
| 2012/0320154 A1* | 12/2012 | Berger ............... | H04N 13/0011 348/43 |

FOREIGN PATENT DOCUMENTS

| | | |
|---|---|---|
| JP | 2007036368 | 2/2007 |
| JP | 2010211646 | 9/2010 |

OTHER PUBLICATIONS

Gurler C G et al: "Adaptive stereoscopic D video streaming", 2010 Proceedings of 17th IEEE International conference on image processing (ICIP 2010), Sep. 26, 2010, pp. 2409-2412.

Saygili G et al: "Quality assessment of asymmetric stereo video coding", 2010 Proceedings of 17th IEEE International Conference on Image processing (ICIP 2010),2010, pp. 4009-4012.

Tekalp A M et al: "3DTV over IP, IEEE signal processing magazine", vol. 24, No. 6, Nov. 6, 2011, pp. 77-87.

Van Lancker W et al: "HTTP adaptive streaming with media fragment URIS", Proceedings of the 2011 IEEE International conference on multimedia and expo (ICME 2011), 2011, pp. 6.

Goran Petrovic et al: "Toward 3D IPTV design and implementation of a stereoscopic and mutiple-perspective video streaming system", Proceedings of SPIE, vol. 6803, Jan. 28, 2008, pp. 505-512.

Search Report dated Jan. 3, 2013.

* cited by examiner

PROCESSING DEVICE FOR THE GENERATION OF 3D CONTENT VERSIONS AND ASSOCIATED DEVICE FOR OBTAINING CONTENT

This application claims the benefit, under 35 U.S.C. § 365 of International Application PCT/EP2012/073530, filed Nov. 23, 2012, which was published in accordance with PCT Article 21(2) on Jun. 6, 2013 in English and which claims the benefit of French patent application No. 1160868, filed Nov. 28, 2011.

TECHNICAL DOMAIN OF THE INVENTION

The invention relates to the transmission of three-dimensional (or 3D) content in a mode referred to as streaming or on-the-fly playback.

By "three-dimensional content" is understood here a set of data which defines a television, video or game programme, possibly on demand, comprising at least two disparate image sequences obtained or generated from slightly different angles and intended eventually to be presented simultaneously in order to provide a three-dimensional visual impression. Therefore, it could in a non-restrictive example involve content referred to as stereoscopic.

PRIOR ART

The streaming of a content comprises transmitting successively to at least one content receiver, via a communication network (wired or wireless), sub-parts of a content in order that they may be used in real time. This type of transmission can be made by means of various streaming protocols, such as for example RTP, MPEG, TS/UDP, HTTP streaming, HTTP adaptive streaming or Smoothstreaming, generally after the content has been encoded, notably to reduce its size, for example by means of a video compression technique, such as MVC ("Multiview Video Coding"), AVC ("Advanced Video Coding") or SVC ("Scalable Video Coding").

When a content receiver receives a sub-part of a 3D content encoded by means of one of the previously cited video compression techniques, it must conduct its decoding on the fly. Yet, persons skilled in the art know that the encoding/decoding of a content introduces almost no degradation in final visual quality of a 3D content on the condition that it is done using high bits rates (typically higher than 4000 kbps (kilobits per second) for standard definition, or higher than 7000 to 8000 kbps for high definition, or higher than 10000 kbps for very high definition). The bit rates being subject to fluctuations within a communication network, sometimes significantly and/or over a long period, it is understood that the visual quality of a recovered 3D content on a screen (coupled to a content receiver) can vary significantly over time, which can cause a partial or complete scrambling of the images which can constitute a genuine discomfort for the observer.

SUMMARY OF THE INVENTION

The purpose of the invention is therefore to improve the situation when the transmission conditions within a communication network cannot be guaranteed due to potential fluctuations.

For this purpose, the invention proposes notably a first device intended to process three-dimensional content, comprising at least two image sequences obtained or generated from different angles, and wherein a three-dimensional rendering is associated to a level of disparity between said at least two image sequences. The first device is configured to generate from a content at least two different content versions corresponding to different levels of disparity adapted to different transmission bit rates wherein the disparity level decreases with said transmission bit rate.

The first device according to variant embodiments of the invention can comprise other characteristics that can be taken separately or in combination, and notably:
- it can be set up to generate the content versions according to a law for the change in the level of disparity as a function of transmission bit rate;
  - the law can comprise a transmission bit rate threshold below which the level of disparity is equal to zero;
    - it can be set up to encode only one of the image sequences of a content in order to produce a version only when it corresponds to a transmission bit rate which is below the threshold;
- it can be set up to generate a description file describing the respective levels of disparity and/or the respective transmission bit rates of the versions of a content, with a view to its storage in correspondence with these versions;
- it can be set up to produce versions of a content which comprise reference frames having temporal positions identical from one version to another;
- it can be set up to encode each sequence of each content independently of the other sequences of this same content, so that each version of a content consists of sub-groups of data associated respectively with the sequences and corresponding respectively to different levels of disparity or corresponding respectively to complementary levels of disparity to define separately or at least two the different levels of disparity;
- it can be set up to generate each content version by video encoding means applying compression technique chosen from a group comprising at least MVC, AVC and SVC.

Such a first processing device can, for example, be part of a content server.

The invention also proposes a second device, intended to obtain content, for a content receiver, and set up to select a version of an encoded content according to a chosen level of disparity and/or of a chosen transmission bit rate wherein at least two different content versions corresponding to different levels of disparity adapted to different transmission bit rates are stored on a content storage server (SC), and wherein said disparity level decreases with said transmission bit rate, and to command its content receiver to request a selected version from a content storage server.

This second device can be set up to command its content receiver to recover from the server a description file, which is stored in correspondence with the versions of a content which it wishes to obtain and which describe their respective levels of disparity and/or their respective transmission bit rates, then to start a continuous content playback session by substantially continuously controlling the chosen version of this content according to the desired level of disparity and/or the desired transmission bit rate.

Such a second device can, for example, be part of a content receiver such as a Set-Top Box, a decoder, a residential gateway, a fixed or portable computer, a mobile telephone, a personal digital assistant or an electronic tablet.

BRIEF DESCRIPTION OF THE DRAWINGS

Other characteristics and advantages of the invention will appear upon examination of the detailed description hereafter, and the annexed drawings, wherein.

The annexed drawings can be used not only to complete the invention, but also to contribute to its definition, if necessary.

DETAILED DESCRIPTION

The purpose of the invention is notably to propose a processing device D1 intended to process three-dimensional content, comprising at least two image sequences obtained from different angles, and intended to be transmitted to at least one content receiver RC via a communication network R.

In what follows, it is considered as a non-restrictive example that the content receiver RC is a set-top box (or STB). But the invention is not limited to this type of content receiver. It relates in fact to all types of content receiver able to be connected to at least one communication network in order to receive content, and capable of recovering a 3D content (possibly stereoscopic (active or passive device)). Therefore, it could also involve, for example, a decoder, a residential gateway, a fixed or portable computer, a mobile telephone (possibly of smartphone type), a personal digital assistant (or PDA), an electronic tablet, or a games console.

Moreover, it is considered in what follows, as a non-restrictive example, that the 3D (or stereoscopic) contents are videos. But the invention is not limited to this type of 3D (or stereoscopic) content. It relates in fact to all types of content comprising at least two image sequences obtained or generated from slightly different angles and intended eventually to be presented simultaneously to an observer in order to provide him with a three-dimensional visual impression. Therefore, it could also involve television programmes, games, images of sporting events, educational content, cinematographic content, or computer generated images (or CGI).

Figure 1:
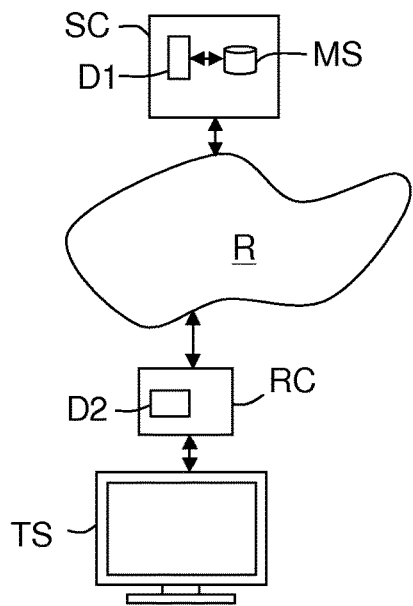
FIG. 1 shows diagrammatically and functionally a communication network to which are connected, on one hand, a content server equipped with a first processing device according to an embodiment of the invention, and, on the other hand, a content receiver equipped with a second content-obtaining device according to another embodiment of the invention.

FIG. 1 shows diagrammatically a communication network R to which are connected a content server SC, suitable for storing 3D content (processed by a processing device D1), and a content receiver RC, intended to decode 3D content transmitted by the server SC (at the request of a content-obtaining device D2).

For example, and as shown in a non-restrictive manner, the set-top box RC is coupled to at least one television set TS responsible for recovering the 3D content which it has decoded and which were supplied from a content server SC via the communication network R.

It is considered hereafter, in a non-restrictive example, that the communication network R comprises the Internet network connected to a user communication equipment by an xDSL access network. But, the invention is not limited to this type of communication network. In fact, the communication network R can be wired or wireless. Thus, it could also involve a cable or fibre type wired network, or a mobile or cellular or WLAN ("Wireless Local Area Network"—possibly of type 802.11 (or WiFi) or WiMAX) network. The communication network R can also consist of disjoint sub-networks with for example a unidirectional broadcast network, for example of television type, and a bidirectional network, for example of broadband (xDSL) Internet access type.

A processing device D1, according to an embodiment of the invention, is set up to generate from one 3D (or stereoscopic) content at least two different content versions Vj which correspond to different levels of disparity adapted to different transmission bit rates DB, with three-dimensional renderings of different quality at at least one screen coupled to a content receiver RC.

Such a processing device D1 can, as shown in a non-restrictive manner, be associated with a (content) server SC.

It is understood here by "associated" both the fact of being an integral part of the server SC (as shown) and the fact of being coupled directly to the server SC. Therefore, a processing device D1 can be implemented in the form of software modules, or a combination of electronic circuits and software modules.

But in one embodiment, the server SC could be supplied with 3D content versions Vj previously generated by a processing device D1 which is completely independent of it.

It will be noted that the processing device D1 can be set up to generate each version Vj by video encoding means applying compression technique. This technique can be, for example, MVC, AVC or SVC.

The different versions Vj of a 3D content, which are generated by a processing device D1, can be stored in means of storage MS of the server SC. These means of storage MS can be presented in any form known to those skilled in the art, including software. Therefore, it could involve a memory.

It will be noted that the content versions having a disparity lower than that of the original content can be generated on demand (and not produced in advance and stored). Thus, at the request of a content receiver RC from a server SC for a version Vj, the server SC can, when this version is not available, request its generation in order to supply it to the requesting content receiver. This allows the production of versions Vj to be delayed in order to limit the storage space. This solution is notably applicable to programmes broadcast live.

These 3D content versions FVj are then available to content receivers RC via the communication network R. The different versions Vj of a 3D content corresponding to different levels of disparity appropriate to different transmission bit rates, it is understood that they are particularly well-suited to fluctuating transmission conditions within the communication network R.

The more the disparity between the different image sequences of a 3D content is reduced, the less significant the 3D effect and the less significant the impact of the encoding (for example by video compression) on these video image sequences, and therefore the easier it will be for an observer to observe the combination of these image sequences without visual discomfort once they have been decompressed.

Figure 2:
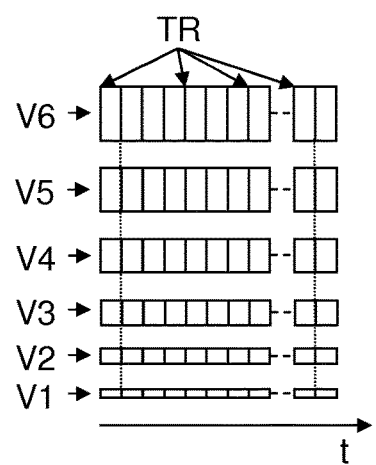
FIG. 2 shows diagrammatically six different versions of the same content, obtained by means of the processing device according to an embodiment of the invention.

FIG. 2 shows six different versions of a same content obtained by means of a processing device D1 (the variable t represents time and each rectangle represents a set of compressed video data frames comprising notably a reference frame TR). For example; the first version V1 is adapted to a transmission bit rate DB equal to 1 Mbps (Megabits per second), the second version V2 is adapted to a transmission bit rate DB equal to 2 Mbps, the third version V3 is adapted to a transmission bit rate DB equal to 3 Mbps, the fourth version V4 is adapted to a transmission bit rate equal to 4 Mbps, the fifth version V5 is adapted to a transmission bit rate DB equal to 5 Mbps, and the sixth version V6 is adapted to a transmission bit rate equal to 6 Mbps.

It will be noted that a processing device D1 can produce a number of content versions Vj as large as desired, provided this number is at least equal to two.

For example, a processing device D1 can generate the versions Vj of a 3D content according to a law governing the change in the level of disparity ND as a function of transmission bit rate DB. In this case, the size in number of bits of each version Vj depends on the associated level of disparity ND. The higher the level of disparity ND of a version Vj, the larger the size of this version Vj and therefore the higher the associated transmission bit rate DB. This can be seen in the non-restrictive example in FIG. 2. In fact, the rectangles of the different versions Vj (here j=1 to 6), which each represent a set of compressed data frames, have surface areas (representing their respective sizes) which increase in size moving from the first version V1 (offering the smallest level of disparity ND) to the sixth version V6 (offering the greatest level of disparity ND).

Figure 3:
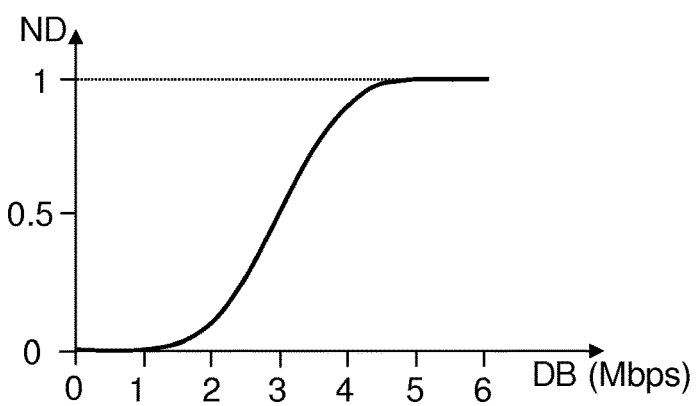
FIG. 3 shows diagrammatically in a graph a first example of a law for the change in the level of disparity (ND) as a function of transmission bit rate (DB)

FIG. 3 shows diagrammatically in a graph a first example of a law (ND=f(DB)) for the change in the level of disparity ND as a function of transmission bit rate DB. Here, the change follows a law noticeably of hyperbolic tangent type. The non-restrictive example in FIG. 2 results from the use of a law of this type. It will be understood that a version Vj associated with a level of disparity ND equal to one (1) uses the image sequences of a 3D content which exhibit a maximum disparity, while a version Vj' associated with a level of disparity ND equal to zero (0) uses the image sequences of a 3D content which exhibit a minimum disparity (possibly zero), and that a version Vj" associated with a level of disparity ND comprised between the values zero (0) and one (1) uses the image sequences of a 3D content which exhibit an intermediate reduced disparity.

Figure 4:
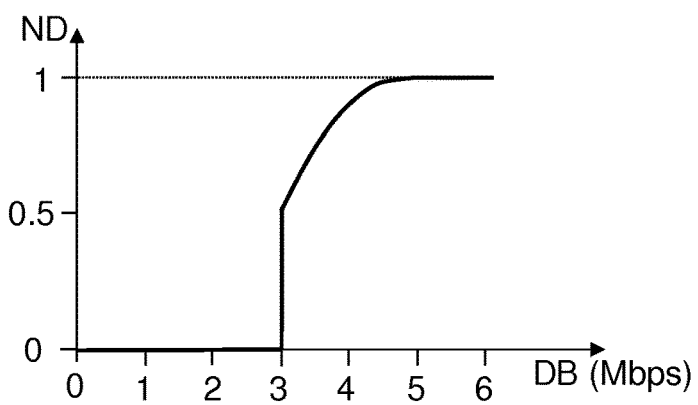
FIG. 4 shows diagrammatically in a graph a second example of a law for the change in the level of disparity (ND) as a function of transmission bit rate (DB).

It will be noted that other types of law than that shown in FIG. 2 can be used. Thus, the law (ND=f(DB)) can comprise a transmission bit rate threshold below which the level of disparity ND is equal to zero (0). FIG. 4 shows diagrammatically in a graph a second example of a law (ND=f(DB)) for the change in the level of disparity ND as a function of transmission bit rate DB comprising a threshold of the type previously cited, here located at approximately 3 Mbps. In this case, for all transmission bit rates DB less than or equal to 3 Mbps, a zero level of disparity ND is associated.

It will be understood that in the presence of a zero level of disparity ND, there is no longer a difference (or disparity) between the image sequences of a 3D content, and therefore there can no longer be a 3D effect. Therefore, to reduce the transmission bit rate DB, it can be advantageous that the processing device D1 is configured to encode (or compress) only one of the image sequences for a 3D content in order to produce a version Vj when it corresponds to a transmission bit rate DB which is below the threshold of the law (ND=f(DB)). The other sequences therefore no longer contribute to the version Vj concerned, since they are considered approximately identical to the one being used.

It will be noted that the processing device D1 can also be set up advantageously to generate a description file which describes the respective levels of disparity and/or the respective transmission bit rates of the versions Vj of a 3D content, with a view to its storage in correspondence with these versions Vj (here in the storage means MS of the server SC). The interest of these description files will be discussed further below.

It will be noted that the processing device D1 can be set up advantageously to produce versions Vj of a 3D content which comprise reference frames TR whose temporal positions are identical from one version to another. This is the case notably in the non-restrictive example shown in FIG. 2. It is recalled that the reference frames TR are those which allow a sub-part of a content which is transmitted in streaming mode to be randomly accessed. This feature of the encoding (or compression) of 3D content data enables a decoder installed in a content receiver RC to move from one version Vj to another Vj', on request, at precise times (which are the times of transmission of the reference frames TR) without inducing visual artifacts.

It will also be noted that the processing device D1 can encode (or compress) some sequences of a 3D content as a function of one or more of the other sequences of this same 3D content to generate each version Vj. But in one embodiment, it (D1) can be set up to encode each sequence of each 3D content independently of the other sequences of this same 3D content. Thus, each version Vj of a 3D content consists of sub-groups of data which are respectively associated with different sequences and either correspond respectively to different levels of disparity ND, or complementary levels of disparity ND to define separately or at at least two the different levels of disparity ND. For example, a first sub-group associated with an image sequence can consist of a base layer associated with a first level of disparity, a second sub-group associated with this same image sequence can consist of a base layer and a first enhancement layer, associated with a second level of disparity higher than the first, and a third sub-group associated with this same image sequence can consist of a base layer and first and second enhancement layers, associated with a third level of disparity higher than the first and second.

As discussed above, the version Vj which are stored in the server SC are intended to be transmitted on request to at least one content receiver RC.

For this purpose, each content receiver RC can be associated with a content-obtaining device D2 according to the invention.

It is understood here by "associated" both the fact of being an integral part of the content receiver RC (as shown non-restrictively) and the fact of being coupled directly to the content receiver RC. Therefore, a content-obtaining device D2 can be implemented in the form of software modules, or a combination of electronic circuits and software modules.

This content-obtaining device D2 is set up to select a version Vj of an encoded 3D content (which is requested by a user of the content receiver RC) according to a chosen level of disparity ND and/or a chosen transmission bit rate DB, and to command this content receiver RC to request the version Vj selected from a server SC which stores this required 3D content. The choice can be made by the observer who requests a 3D content, at the same time as his request, or during pre-programming, or automatically by the content-obtaining device D2 in accordance with the preferences of the observer.

It is understood that the selection of a version Vj can be made according to a chosen level of disparity ND, for example when there is a desire to impose a particular level of 3D rendering and therefore a particular disparity (independently of the conditions offered by the communication network R at the time of selection and independently of the quality of the images), or as a function of chosen transmission bit rate DB, for example when there is a desire to ensure that the version Vj will be compatible with the bit rate conditions offered by the communication network R at the time of selection in order that the quality of the images is good (whatever the level of 3D rendering which this implies), or as a function of a chosen level of disparity ND and of a chosen transmission bit rate DB.

In order to identify the different versions Vj of a desired 3D content, the content-obtaining device D2 can be set up to command its content receiver RC to recover from the server SC concerned the description file which it stores in correspondence with these versions Vj (and which describes their respective levels of disparity and/or their respective transmission bit rates). In this case, once the content receiver RC has recovered from the server SC concerned the required description file, the content-obtaining device D2 can start a streaming session by substantially continuously controlling the chosen (or selected) version of the desired 3D content as a function of the desired level of disparity ND and/or of the desired transmission bit rate. The content-obtaining device D2 will then supply to its content receiver RC the designation of each version Vj which it selects (and which is mentioned in the description file) in order that the device requests it from the server SC concerned.

It will be noted that the protocol of transmission by streaming can be HTTP, for example. But all other protocols of transmission by streaming allowing a "feedback" from the content receiver RC can be used, notably RTP, MPEG, TS/UDP, HTTP adaptive streaming and Smoothstreaming.

It will also be noted that the obtaining device D2 can be associated with several sub-networks. In this case, the obtaining strategy can be made according to the characteristics specific to each sub-network. For example in the case where a version Vj is composed of sub-groups of complementary images, as described previously, the base version can be broadcast via a unidirectional broadcast sub-network, for example of television type, while the "improved" versions (therefore at a higher level of disparity) can be obtained on demand, from the base version and the groups of complementary images, obtained via a bi-directional sub-network, for example of Internet access type (such as xDSL), according to the desired level of disparity ND and/or of the desired transmission bit rate DB on this sub-network.

Thanks to the invention, it is now possible to limit the impact of high compressions on the 3D content, imposed by bad transmission conditions within a communication network, by reducing the 3D effect in order that the observer is not (too) unsettled and/or that it does not cause visual fatigue.

The invention is not restricted to the embodiments of the processing device, server, content-obtaining device and content receiver described above, only as an example, but it covers all the variants that those skilled in the art will be able to envisage within the framework of the following claims.

The invention claimed is:

1. A device for processing three-dimensional content, said three dimensional content having at least two image sequences obtained or generated from different angles and transmitted via a communication network, wherein a three-dimensional rendering of the content is associated with a level of disparity between said at least two image sequences, said device being configured to generate from said content at least two different content versions corresponding to different levels of disparity adapted to different transmission bit rates of the network, and to encode at least one of the image sequences of content, wherein the level of disparity decreases when the transmission bit rate of the network decreases, the device being further configured to:
 encode only one of the said image sequences of a content in order to produce a version corresponding to a transmission bit rate below said threshold; and
 generate said content versions according to a law for the level of disparity as a function of the transmission bit rate, wherein said law comprises a transmission bit rate threshold below which the level of disparity is equal to zero.

2. The device according to claim 1, further configured to generate a description file describing the levels of disparity and/or the transmission bit rates of the versions of a content, said description file being stored in correspondence with said versions.

3. The device according to claim 1, further configured to produce versions of content which comprise reference frames having temporal positions which are identical from one version to another.

4. The device according to claim 1, further configured to encode each sequence of each content independently of the other sequences of this same content, so that each version of said content consists of sub-groups of data associated respectively with said sequences and corresponding respectively to the different levels of disparity, or corresponding respectively to complementary levels of disparity to define separately or at at least two the different levels of disparity.

5. The device according to claim 1, further configured to generate each version by video encoding means applying a compression technique chosen from a group comprising at least MVC, AVC and SVC.

6. A server comprising a processing device according to claim 1.

7. A three-dimensional content-obtaining device, for a content receiver, said three-dimensional content having at least two image sequences obtained or generated from different angles and transmitted via a communication network, wherein a three-dimensional rendering of the content is associated with a level of disparity between said at least two image sequences; said device being configured to select a version of content according to a chosen level of disparity adapted to a chosen transmission bit rate of the network, wherein at least two different content versions corresponding to different levels of disparity adapted to different transmission bit rates of the network are stored in a content storage server, and wherein the level of disparity decreases when the transmission bit rate of the network decreases; said device being further configured to:
 command said content receiver to request said selected version from a content storage server,
 encode only one of the said image sequences of a content in order to produce a version corresponding to a transmission bit rate below said threshold; and
 generate said content versions according to a law for the level of disparity as a function of the transmission bit rate, wherein said law comprises a transmission bit rate threshold below which the level of disparity is equal to zero.

8. The three-dimensional content-obtaining device according to claim 7, being further configured to command said content receiver to recover from said server a description file, which is stored in correspondence with the versions of a content which it wishes to obtain and which describe their respective levels of disparity and/or their respective transmission bit rates, then to start a streaming session by continuously controlling the chosen version of said content according to the desired level of disparity and/or the desired transmission bit rate.

9. A content receiver comprising a three-dimensional content-obtaining device according to claim 7.

* * * * *